(12) United States Patent
Schol

(10) Patent No.: US 6,822,649 B1
(45) Date of Patent: Nov. 23, 2004

(54) DEVICE WITH AN OPERATING PARAMETER WHOSE VALUE CAN BE PRESELECTED BY MEANS OF A CONTROL UNIT

(75) Inventor: Amy Gretchen Schol, Dormitz (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/701,895

(22) PCT Filed: May 28, 1999

(86) PCT No.: PCT/DE99/01580

§ 371 (c)(1),
(2), (4) Date: Jan. 29, 2001

(87) PCT Pub. No.: WO99/63410

PCT Pub. Date: Dec. 9, 1999

(30) Foreign Application Priority Data

Jun. 2, 1998  (DE) .......................... 198 24 496

(51) Int. Cl.⁷ .............................................. G06T 11/20
(52) U.S. Cl. ..................................................... 345/440
(58) Field of Search ........................... 345/440, 440.2, 345/440.1

(56) References Cited

U.S. PATENT DOCUMENTS

| | | | |
|---|---|---|---|
| 4,400,699 A | | 8/1983 | Glasmacher |
| 4,689,670 A | * | 8/1987 | Okazaki ..................... 378/98.5 |
| 4,730,262 A | * | 3/1988 | Watanabe et al. ........... 345/440 |
| 4,835,690 A | | 5/1989 | Gangarosa et al. |
| 5,463,731 A | | 10/1995 | Diec et al. ................... 395/161 |
| 5,526,394 A | * | 6/1996 | Siczek et al. ................. 378/37 |
| 5,594,772 A | * | 1/1997 | Toki et al. ................... 378/114 |
| 5,612,985 A | * | 3/1997 | Toki et al. ..................... 378/4 |
| 5,625,662 A | * | 4/1997 | Toth et al. .................... 378/16 |
| 5,661,773 A | * | 8/1997 | Swerdloff et al. ............ 378/65 |
| 5,809,106 A | * | 9/1998 | Kitade et al. ............... 378/132 |
| 5,832,051 A | * | 11/1998 | Lutz .............................. 378/8 |
| 5,864,597 A | * | 1/1999 | Kobayashi ..................... 378/4 |
| 6,111,931 A | * | 8/2000 | Kusch ......................... 378/106 |

FOREIGN PATENT DOCUMENTS

| | | |
|---|---|---|
| DE | 81 31 989.4 | 7/1982 |
| DE | 196 17 332 | 8/1997 |
| DE | 297 21 840 | 3/1998 |
| EP | 0 190 899 | 8/1986 |
| FR | 2 647 926 | 7/1990 |
| FR | 2 704 955 | 11/1994 |
| WO | WO 97/15840 | 5/1997 |

OTHER PUBLICATIONS

Microsoft® Excel Screen Shots.*

* cited by examiner

*Primary Examiner*—Michael Razavi
*Assistant Examiner*—Hwa C. Lee
(74) *Attorney, Agent, or Firm*—Schiff Hardin LLP

(57) ABSTRACT

An apparatus with an operating parameter that takes effect with a value for the duration of an activation phase in a number of activation phases following one another at time intervals has whereby a display that indicates the value with which the operating parameter takes effect during an activation phase in the form of rectangles over a time axis.

26 Claims, 4 Drawing Sheets

DEVICE WITH AN OPERATING PARAMETER WHOSE VALUE CAN BE PRESELECTED BY MEANS OF A CONTROL UNIT

BACKGROUND OF THE INVENTION

FIELD OF THE INVENTION

The present invention is directed to an apparatus of the type wherein an operating parameter is effective with a value for the duration of an activation phase in a plurality of activation phases following one at time intervals, wherein the value of the operating parameter, the length of the time intervals or the duration of the activation phases, is pre-selectable via a control unit has a display means for the operating parameter and enable means, wherein the operating parameter takes effect in the pre-selected way actuation of the enable means.

Given such an apparatus, the value of the operating parameter for the individual activation phases, the length of the time intervals between successive activation phases and the duration of the individual activation phases can be displayed at the display means, for example in the form of a table, in order to provide an operator with an opportunity to check the pre-selected settings before actuation of the enable means. However, this check becomes difficult and time-consuming as soon as a greater number of activation phases is provided.

The invention is based on the object of specifying an apparatus of the species initially cited wherein it is possible for an operator to quickly and simply check the pre-selected values.

This object is inventively achieved by an apparatus with an operating parameter that is effective with a value for the duration of an activation phase in a plurality of activation phases following one at time intervals, whereby at least the value of the operating parameter, the length of the time intervals or the duration of the activation phases is pre-selectable via a control unit, and the control unit comprises a display means for the operating parameter and enable means, whereby the display means displays the value with which the operating parameter is effective during an activation phase via a time axis in the form of rectangles, whereby the value of the operating parameter is entered at a right angle to the time axis, the length of the rectangles in the direction of the time axis corresponds to the duration of the respective activation phase and the spacings of the edges of successive rectangles indicating the end and the beginning of a time duration from one another represent the time intervals, and whereby the operating parameter can only take effect in the pre-selected way upon actuation of the enable means.

In the case of the invention, thus, the pre-selected values of the operating parameter are two-dimensionally and simultaneously displayed in the time sequence in which they are to take effect, so that a surveyable presentation derives that makes it easy for an operator to check the pre-selected values before actuation of the enable means. The inventive apparatus thereby makes use of the fact that the human eye can perceive graphic objects far faster than it can read characters. As particularly regards the chronological succession and duration of the activation phases, the specified type of graphic display is superior to, for example, a tabular presentation. The clear presentation of much information is thus possible in the case of the inventive apparatus without the risk of mis-operations. An operator is thus provided with additional certainty that the apparatus is in fact activated in the way intended by the operator.

To avoid incorrect operations, in an embodiment of the invention, the control unit implements a check of the permissibility of the values that have been set with respect to the pre-selected value of the operating parameter and/or the duration of the activation phase and/or the time intervals between successive activation phases and inhibits the enable means if an inadmissible value is pre-selected. In this context, an identification of inadmissible values can ensue on the display means, so that an operator can immediately recognize the critical point and provide alleviation. The control unit can determine the allowed value that comes closest to the inadmissible, pre-selected value and cause this value to be displayed on the display means. Inadmissible values thus can be identified by the control unit on the basis of a model of the apparatus stored in the control unit. Alternatively, the control unit can determine the admissible values coming closest to an inadmissible pre-selected values by simulation calculation.

In a further embodiment of the invention, at least one further operating parameter can be displayed on the display means that takes effect during at least a part of the activation phases with a pre-selectable value, with the further operating parameter with illustrated as a stripe within the rectangle representing an activation phase within which the further operating parameter takes effect, and the width of the stripe in the direction of the time axis corresponding to the pre-selected value of the further operating parameter.

The apparatus is preferably a medical apparatus and, in particular, an apparatus containing an X-ray tube, preferably a computer tomography (CT) apparatus or an X-ray angiography apparatus, wherein the tube current or the mAs product can be set as the operating parameter, the duration of the X-radiation can be set as the duration of the activation phase, and the waiting time between successive exposures can be set as time interval between successive activation phases.

DESCRIPTION OF THE PREFERRED EMBODIMENTS

Figure 1:
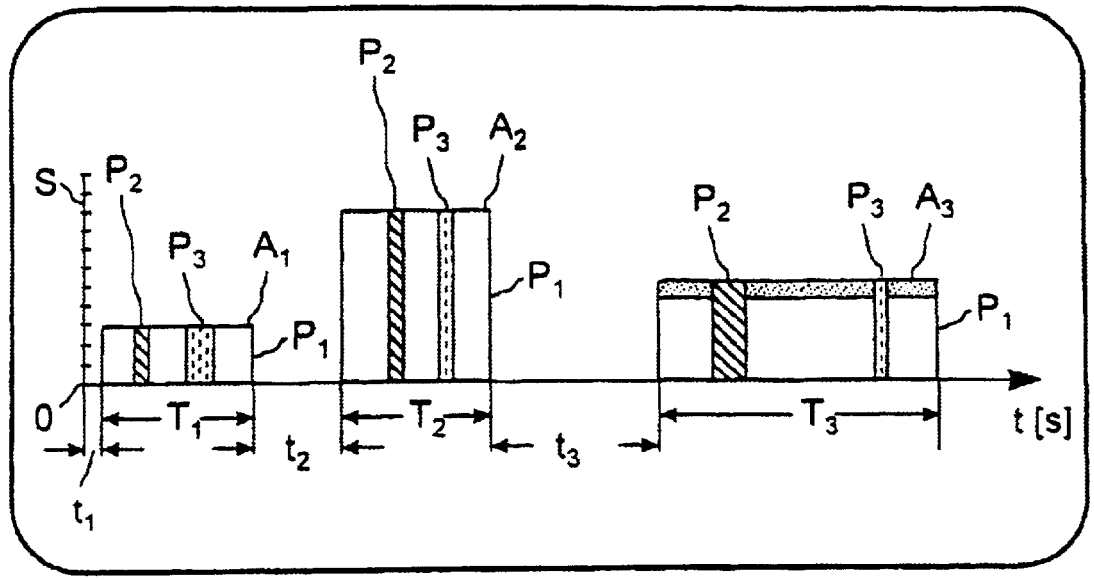
FIG 1. shows the image which appears on the display of an apparatus constructed in accordance with the principles of the present invention, as a general example.

FIG. 1 shows the image appearing on the display means of an inventive apparatus for an operating mode wherein an operating parameter $P_1$ takes effect with different values in three successive activation phases $A_1$ through $A_3$.

The activation phases $A_1$ through $A_3$ are illustrated by rectangles arranged on a time axis t, whereby the length of the rectangles in the direction of the time axis t corresponds to the respective duration $T_1$ through $T_3$ of the activation phases $A_1$ through $A_3$, whereas the height of the rectangles transversely relative to the direction of the time axis t corresponds to the value with which the operating parameter $P_1$ takes effect in the respective activation phase $A_1$ through $A_3$.

A scale referenced S for the value of the operating parameter $P_1$ is attached in the origin O of the time axis t.

The rectangles illustrated in the activation phases $A_1$ through $A_3$ are placed such on the time axis t that the distance of the first activation phase $A_1$ from the origin O of the time axis and the spacings between successive activation phases $A_1$ and $A_2$ or, respectively, $A_2$ and $A_3$ correspond to the time interval $t_1$ between the origin O of the time axis t and the beginning of the activation phase $A_1$, the time interval $t_2$ between the end of the activation phase $A_1$ and the beginning of the activation phase $A_2$, as well as the time interval $t_3$ between the end of the activation phase $A_2$ and the beginning of the activation phase $A_3$.

It is thus apparent that the way in which the apparatus is to be activated can be seen in a very surveyable way.

In the case of the activation phase $A_3$, a value for the operating parameter $P_1$ is pre-selected that is not possible in the operating condition of the apparatus present at the point in time of the activation phase $A_3$. This is illustrated by a stripe-shaped region of the rectangle illustrating the activation phase $A_3$ that proceeds parallel to the time axis t being shown in a different color, illustrated with a different hatching in FIG. 1. The stripe is thereby shown with such a width that the width of the region remaining between the stripe and the time axis t illustrates that value of the operating parameter $P_1$ that comes closest to the inadmissible, preselected value.

In the display presentation in the inventive apparatus, therefore, if an inadmissible, pre-selected value, among a number of values, is entered, the inadmissible value can be clearly and easily seen, and the value which must be selected in place of the inadmissible value also can be clearly and easily seen.

The pre-selected values of two other operating parameters P2 and $P_3$ are also illustrated in FIG. 1 for the activation phases $A_1$ through $A_3$, namely by respective stripes $P_2$ and, $P_3$ in FIG. 1 and proceeding transversely relative to the time axis t that deviate in color from the color of the rectangles (again illustrated by different hatching) and whose extent in the direction of the time axis t corresponds to the pre-selected value of the respective operating parameters $P_2$ and, $P_3$ for the respective activation phases $A_1$ through $A_3$.

It is thus also apparent that, in the inventive apparatus, values of other operating parameters are displayed in a clear and easily surveyable manner.

Figure 2:
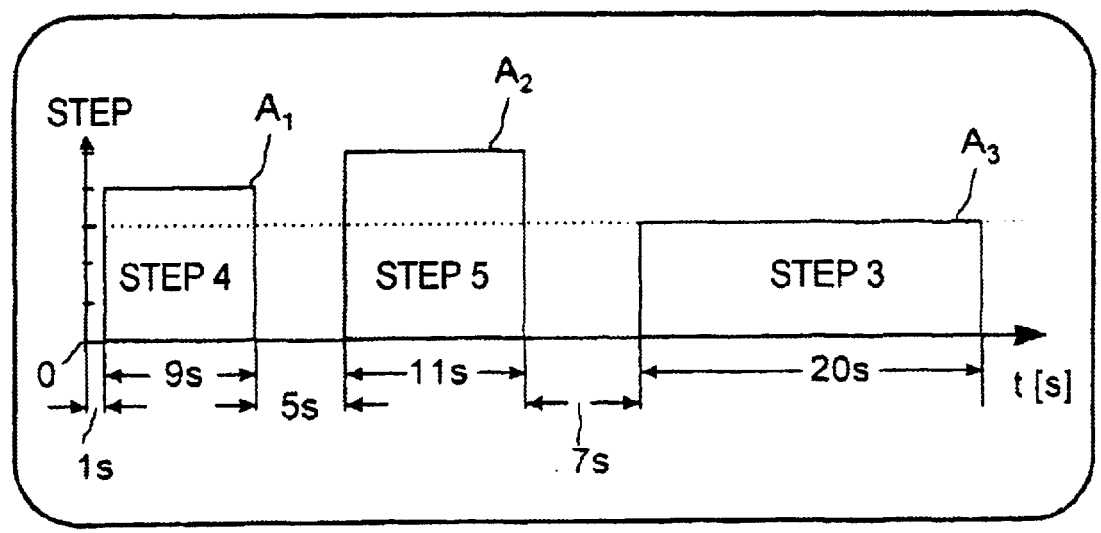
FIG. 2 shows the image which appears on the display of a microwave oven constructed in accordance with the principles of the present invention.

The invention is illustrated in FIG. 2 with reference to the example of an inventively fashioned microwave oven, only the display thereof being shown in FIG. 2. The microwave oven is to be operated in three activation phases $A_1$ through $A_3$ according to the following Table 1.

TABLE 1

| Activation phase | Delay | Duration | Step |
|---|---|---|---|
| $A_1$ | 1 s | 9 s | 4 |
| $A_2$ | 5 s | 11 s | 5 |
| $A_3$ | 7 s | 20 s | 3 |

It can be directly seen that the graphic appearing on the display of the inventive microwave oven and shown in FIG. 2 illustrates the preselected operating mode of the microwave oven significantly more clearly than the table is capable of doing.

A quick look on the part of the operator, namely, already suffices in order to check the pre-selected values.

An additional advantage is thereby comprised therein that the areas of the rectangles illustrating the activation phases $A_1$ through $A_3$ show the heat quantity respectively supplied to the material to be heated during the respective activation phase $A_1$ through $A_3$ and, thus, the overall area of the rectangles illustrating the activation phase $A_1$ through $A_3$ shows the heat supply overall to the material to be heated.

Particularly with regard to a frequently employed operating mode, an operator can recognize—far faster than when reading a table—on the basis of the displayed graphic pattern whether the correct setting was selected even before the operator activates the microwave oven.

Figure 3:
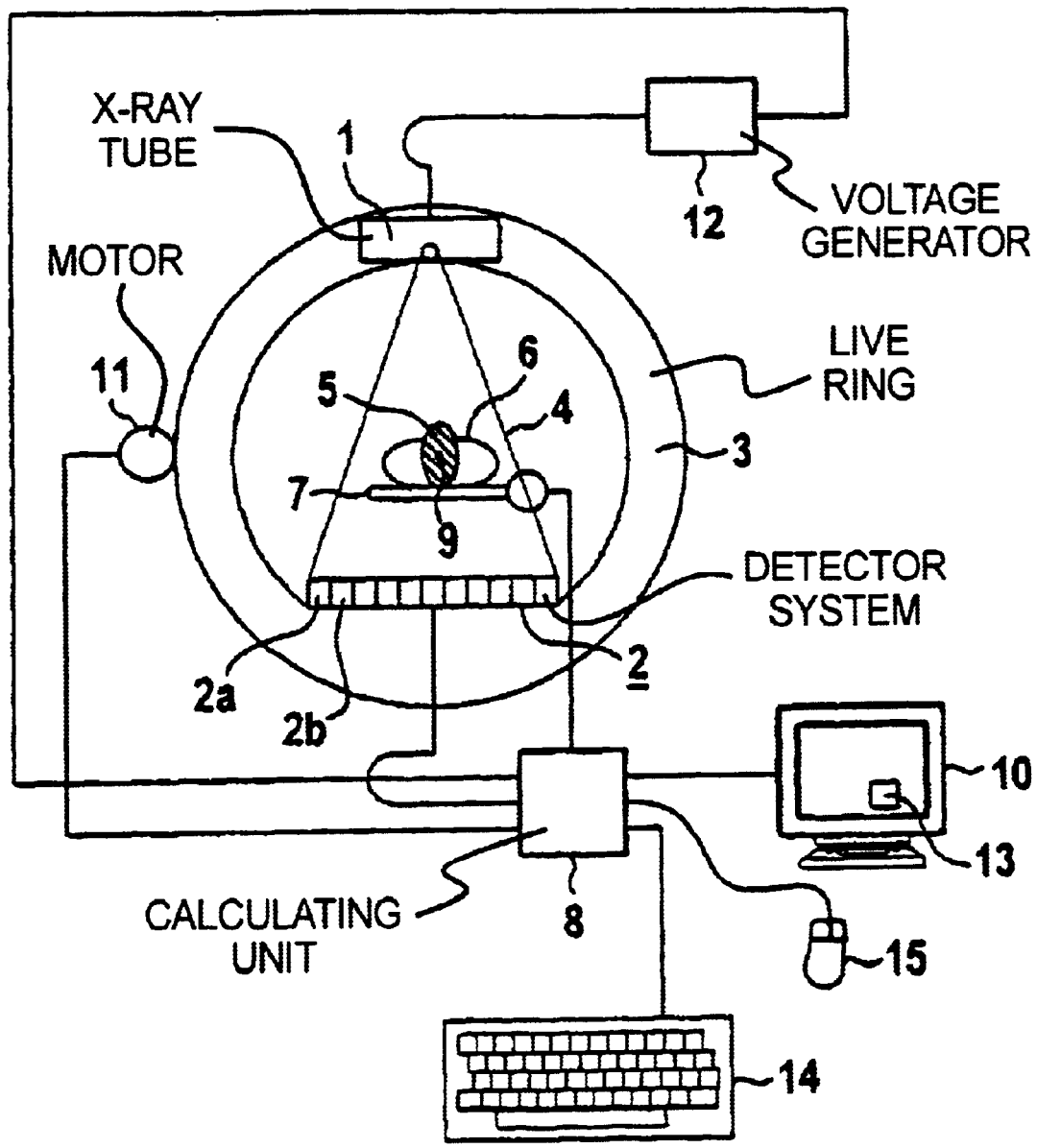
FIG. 3 is a schematic illustration of the basic components of a computed tomography apparatus operating in accordance with the principles of the present invention.
Figure 4:
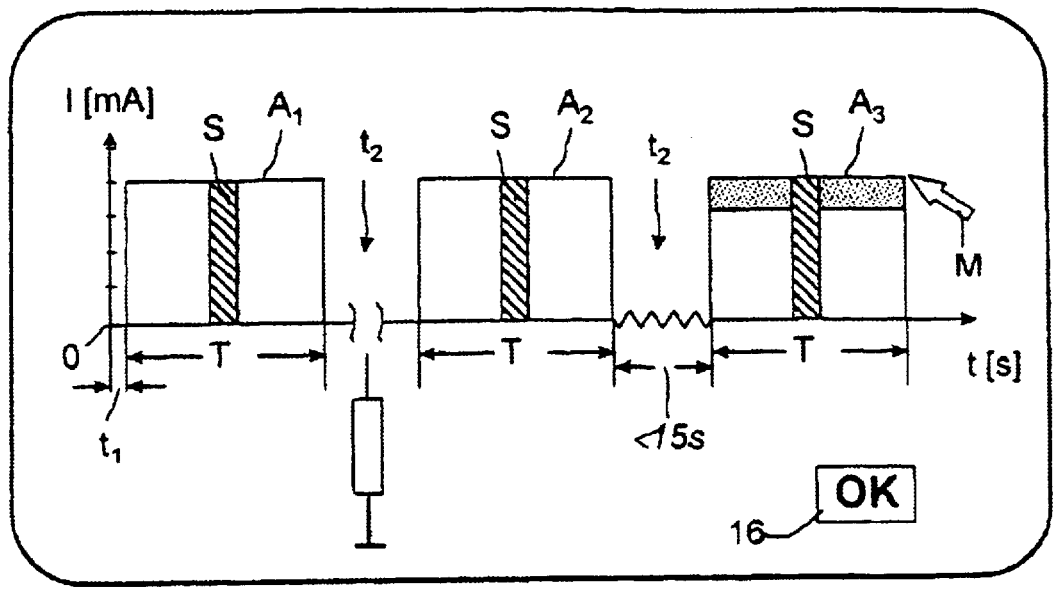
FIG. 4 shows the image appearing on the display of the computed tomography apparatus of FIG. 3, in accordance with the invention.

Another inventive apparatus that relates to the control of an x-ray tube in a CT apparatus is shown in FIGS. 3 and 4.

As shown in FIG. 3, the CT apparatus has an x-ray tube 1 that forms a radiation exposure arrangement together with a detector system 2. The detector system 2 has a number of individual detectors 2a, 2b, etc. The x-ray tube 1 is connected to the detector system 2 via a live ring 3 and emits a fan-shaped x-ray beam 4 that penetrates a slice 5 of a patient 6 to be examined. The patient 6 lies on a patient support 7. The number of individual detectors 2a, 2b, etc., of the detector system 2 is selected according to the desired image resolution. Each individual detector 2a, 2b, etc., supplies an electrical signal that corresponds to the intensity of the respectively received x-radiation.

Individual detectors 2a, 2b, etc., of the detector system 2 are connected to an electronic calculating unit 8 that calculates the x-ray attenuation values of the volume element of the slice 5 from the output signals of the individual detectors 2a, 2b, etc., during the rotation of the radiation measuring means 1, 2 around a rotational axis 9 that preferably proceeds parallel to the longitudinal direction of the patient support 7. On the basis of these x-radiation attenuation values, the calculating unit 8 calculates a tomogram of the investigative slice 5 that can be reproduced on a monitor 10, whereby a specific gray scale value in the illustration of the tomogram corresponds to a specific x-radiation attenuation value. During the rotation of the radiation exposure arrangements 1, 2 around the rotational axis 9, a set of output signals of the detector system 2 is generated by acquiring the output signals of the individual detectors 2a, 2b, etc., for example per angular degree. In this way, 350×512 output signals that form the basis for the calculation of the x-radiation attenuation values of the volume elements of the slice 5 are generated per scan event given, for example, 512 individual detectors in the detector system 2. Only a few of the individual detectors have been shown in the illustrated exemplary embodiment for clarity.

The rotation of the live ring 3 is effected with a motor 11 but is actuated in the required way by the electronic calculating unit 8. The x-ray tube 1 is supplied with the required currents by a voltage generator 12, whereby the generator 12 is likewise driven in the required way by the electronic calculating unit 8 as a control unit. However, a separate control unit can also be provided for controlling the x-ray tube 1 and, potentially other components of the CT apparatus as well.

A field 13 forming at least a part of a graphic user interface is additionally shown on the monitor 10 in the way illustrated in FIG. 4; a separate display alternatively can be provided for this purpose.

In the described exemplary embodiment, an operator can set—among other things—the following operating parameters with the assistance of a keyboard 14 and/or of a mouse 15:

start delay t (s), i.e. waiting before the start of exposure;

radiation duration T (s)

tube current I (mA), and slice thickness S (mm).

It must be taken into consideration when selecting these operating parameters that the anode of the x-ray tube 1 has only a limited heat-storing capacity. An arbitrary radiation duration T given an arbitrary tube current I is therefore not possible at an arbitrary point in time. On the contrary, the radiation duration T that is possible at a specific point in time given a specific tube current I derives from the starting temperature of the anode of the x-ray tube 1 and, thus, from the heat quantity that the anode of the x-ray tube 1 can still absorb before a maximally allowed anode temperature has been reached and, thus, the heat-storing capacity of the anode of the x-ray tube 1 has been at least temporarily exhausted.

The start delay t before the start of the exposure does not always influence the quality of the examination. When, however, a contrast agent, for example, is administered, then it is important that the exposure occur at a specific point in time since the contrast agent will otherwise no longer be located in the area of the patient to be examined.

Typically, a number of exposures are made over a specific time. Each exposure is based on a set of the operating parameters. Most examinations are routine and are repeated several times a day. In the case of known CT apparatus, the monitoring of the operating parameters of all exposures is tedious and errors can easily occur while reading. In the case of the inventive CT apparatus, the operating parameters are therefore graphically displayed in the field 13 of the monitor 10, so that an operator can very easily recognize on the basis of the graphic pattern whether the desired operating parameters are set. Even smaller differences can thereby be dependably noticed.

Three exposures $A_1$ through $A_3$ with identical exposure parameters of radiation duration T, two current I and slice thickness S are implemented according to the following Table 2 in a liver examination.

TABLE 2

| Exposure | Start Delay | Radiation Duration | Tube Current | Slice Thickness |
|---|---|---|---|---|
| $A_1$ | $t_1 = 3$ x | $T_1 = T = 14$ s | $I_1 = I = 240$ mA | $S_1 = S = 5$ mm |
| $A_2$ | — | $T_2 = T = 14$ s | $I_2 = I = 240$ mA | $S_2 = S = 5$ mm |
| $A_3$ | $t_3 = 8$ x | $T_3 = T = 14$ s | $I_3 = I = 240$ mA | $S_3 = S = 5$ mm |

The delay $t_1$ between the start of the examination and the first exposure $A_1$ amounts to three seconds, the start delay $t_2$ between the first exposure $A_1$ and the second exposure $A_2$ is undefined, and the start delay $t_3$ between the second exposure $A_2$ and the third exposure $A_3$ should amount to eight seconds. The start delay between the first exposure $A_1$ and the second exposure $A_2$ is indefinite because, as indicated in FIG. 4 by the interrupted time axis t and a symbolically shown injection syringe, the administration of a contrast agent ensues between the first exposure $A_1$ and the second exposure $A_2$. The exposure $A_1$ thus represents the liver without contrast agent, i.e. in its natural condition. The exposure $A_2$ shows the liver with arterial contrast agent bolus. The delay time between the second exposure $A_2$ and the third $A_3$ is selected such that the exposure $A_3$ shows the liver with portal contrast agent bolus.

FIG. 4 shows the desired examination sequence with the exposures $A_1$ through $A_3$ and the corresponding parameters of tube current I, layer thickness s, radiation duration T and start delay $t_1$ through $t_3$. The illustration thereby simultaneously contains the indication in the field 13 that the start delay between the exposure $A_2$ and the exposure $A_3$ is too short. This can be seen by virtue of the time axis between the exposures $A_2$ and $A_3$ being shown compressed and by an indication in the case of the exposure $A_3$ that the selected current I is too high given the selected start delay $t_3$. In a way analogous to FIG. 1, the tube current coming closest to the requested tube current of 240 mA that is allowed for the selected start delay $t_3$ is thereby shown. It is also indicated in italics that, given a start delay $t_3$ of more than 15 seconds, the exposure $A_3$ could be implemented with the tube current I that has been set, i.e. that comes closest to the requested start delay $t_3$ of 8 s.

On the basis of the information made available to the operator, an operator can now decide, taking the physiological conditions in the case of the respective patient into consideration, whether the start delay $t_3$ should be lengthened or whether the radiation duration $T_3$ and tube current with respect to the exposure $A_3$ should be modified such that a desired mAs product is achieved. Of course, there is also the possibility of modifying both the start delay $t_3$ as well as the mAs product of the exposure $A_3$.

The operator can input the appropriate modifications via the keyboard 14. However, there is also the possibility of shifting the rectangle illustrating the exposure $A_3$ on the time axis t with the assistance of the mouse pointer M and/or of modifying the dimensions of the rectangle upon retention of a mAs product.

When parameters allowed for the exposure $A_3$ have been selected and the operator has undertaken modifications of the parameters relating to the other exposures that may be potentially deemed required, the operator can enable the examination sequence that has been set in that the operator clicks on the enable button 16 shown in the field 13 with the mouse pointer M or correspondingly actuates the keyboard 14. The keyboard 14 and the mouse 15 thus carry out the function of enable means. Such enabling is blocked by the calculating unit 8 functioning as a control unit, as long as there is even only one inadmissible operating parameter present.

The fact that, given the examination sequence according to Table 2, the start delay $t_3$ before the exposure $A_3$ is too short and/or the tube current for the exposure $A_3$ is too high at the applicable point in time, is determined by the calculating unit 8 of the CT apparatus on the basis of a model stored in the CT apparatus that describes the operating behavior of the CT apparatus, particularly the operating behavior of the x-ray tube 1, being determined by simulation calculation. When the simulations are limited to the operating behavior of the x-ray tube 1, the simulation can ensue with a component of the calculating unit 8, namely the tube load computer that is usually present in a CT apparatus.

It becomes clear on the basis of the above comments that the areas of the rectangles illustrating the exposures $A_1$ through $A_3$ correspond to the radiation dose administered to the patient during the respective exposure and, accordingly, the overall area of the rectangles illustrating the exposures $A_1$ through $A_3$ corresponds to the overall dose administered during the examination execution.

It thus becomes clear that an particularly easily surveyable presentation is assured when the operating parameter $P_1$ entered transversely relative to the time axis t is a matter of an operating parameter whose integral over the time supplies an additional statement, as, in the case of the example illustrated in FIG. 2, the overall area of the rectangles is proportional to the heat quantity supplied to the material to be heated and, in the case of the exemplary embodiment according to FIGS. 3 and 4, the overall area of the rectangles is proportional to the radiation dose supplied overall to the patient under examination.

Figure 5:
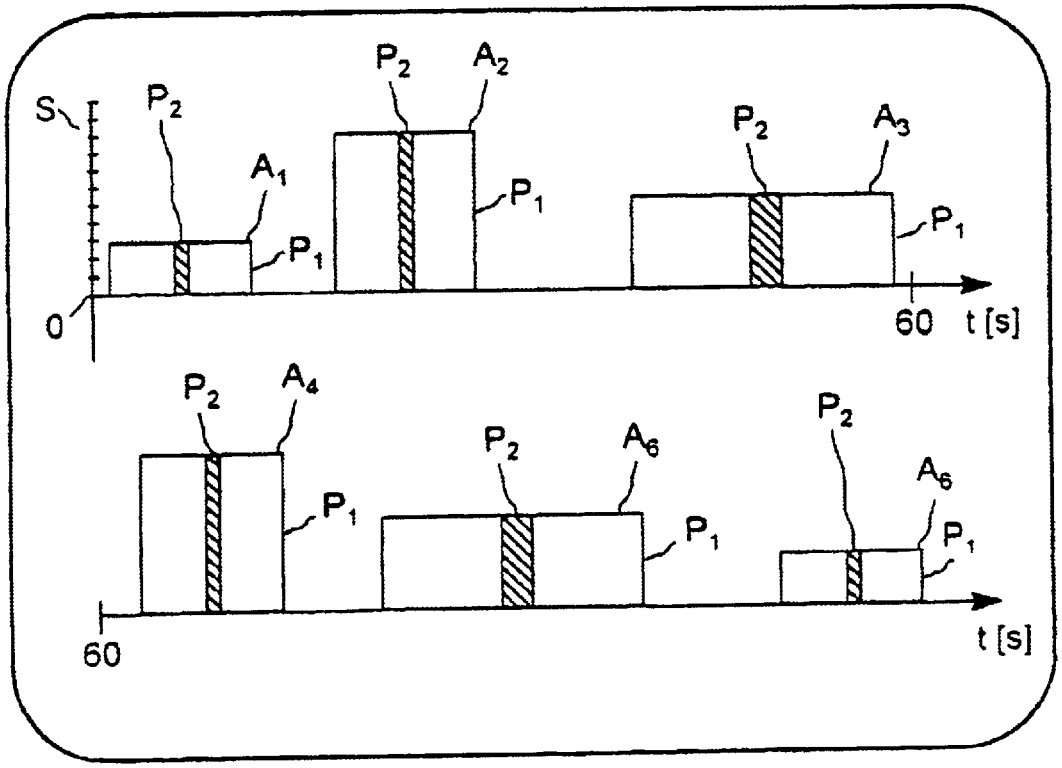
FIGS. 5, 6 and 7 respectively show different versions of the graphic presentation in an apparatus operating in accordance with the principles of the present invention, as further general examples.

As can be seen by example from FIG. 5, the possibility exists of subdividing the time axis t into a number of rows for longer time sequences.

Figure 6:
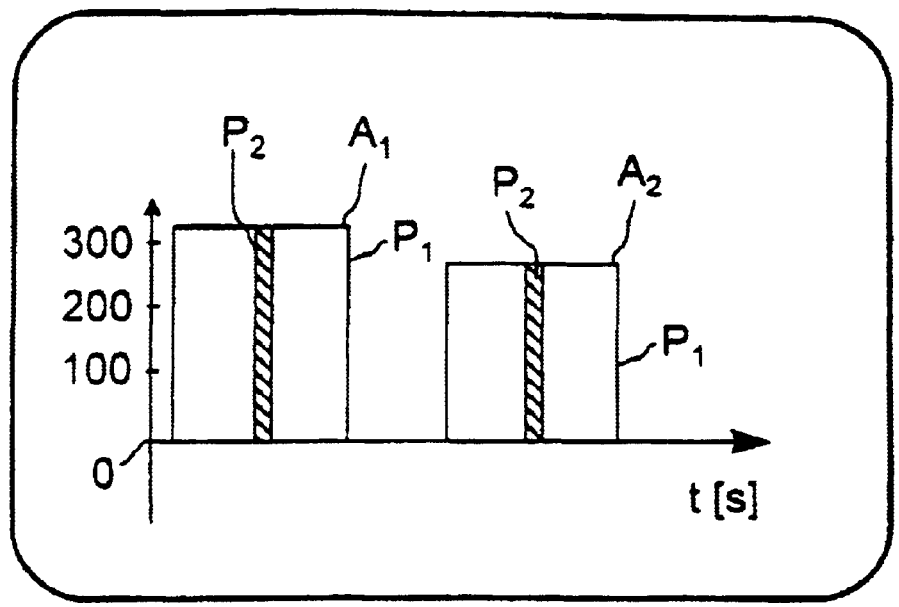
Figure 7:
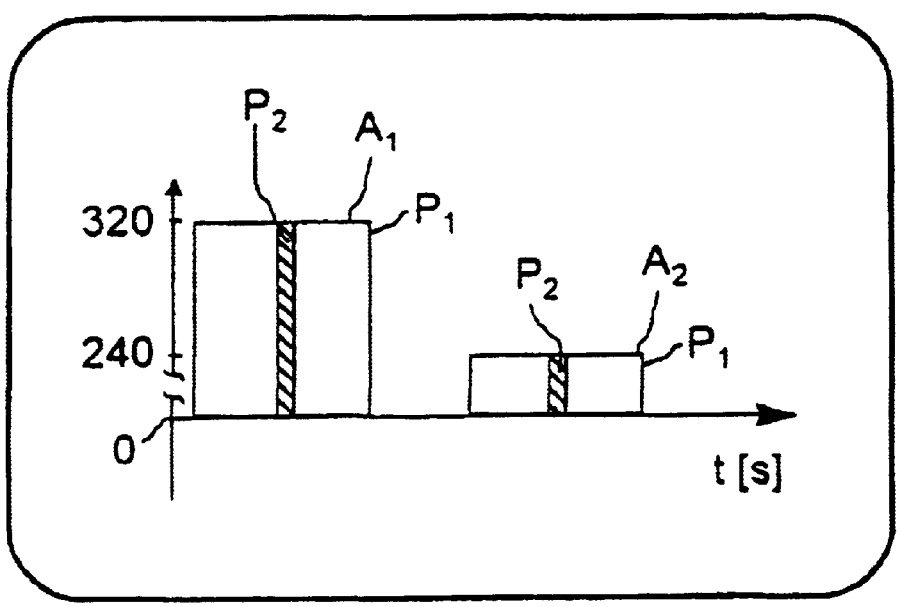

As can be seen in the further example on the basis of FIGS. 6 and 7, it is important to select the scaling of the parameter $P_1$ defining the extent of the rectangles transversely relative to the time axis t such that the standard settings of the operating parameter $P_1$ can be easily distinguished from one another. When, as in the case of FIGS. 6 and 7, a setting of the parameter $P_1$ is only possible at all between the limits 240 and 320, the spread scalings of the operating parameter $P_1$ selected in FIG. 7 makes it far easier to recognize the value of this operating parameter that has been respectively set and in the case of the presentation mode illustrated in FIG. 6 with unspread scaling of the operating parameter $P_1$.

The time axis t respectively runs horizontally in the exemplary embodiments set forth above. However, it is also possible to select a presentation with vertical time axis t.

Although modifications and changes may be suggested by those skilled in the art, it is the intention of the inventor to embody within the patent warranted hereon all changes and modifications as reasonably and properly come within the scope of her contribution to the art.

I claim:

1. An apparatus having an operating parameter associated therewith, said apparatus being operable in a plurality of successive activation phases having respective time durations with said activation phases being respectively separated by time intervals, said apparatus comprising
    a control unit which allows entry of different duration for providing a selectable value for said operating parameter which will be effective in at least one of said activation phases;
    a display connected to said control unit on which said activation phases are shown along a time axis as respective rectangles, each of said rectangles having a length along said time axis corresponding to the time duration of the activation phase represented by that rectangle, and each of the rectangles having edges respectively indicating a beginning and an end of the time duration of the activation phase represented by that rectangle, with respective spacing between respective edges of successive rectangles representing said time intervals, and a height of said rectangle a right angle to said time axis within the rectangle representing the value of the at least one activation phase in which said value of said operating parameter will be effective; and
    an actuatable enabling arrangement connected to said control unit which must be actuated in order to allow said value of said operating parameter entered via said control unit to take effect in said at least one of said activation phases.

2. An apparatus as claimed in claim 1 wherein said control unit allows different selectable values of said operating parameter to be entered which will be respectively effective in different ones of said activation phases, and wherein said display shows said respective values of said operating parameter in the different activation phases in which the respective values of said operating parameter will be effective.

3. An apparatus as claimed in claim 1 wherein said control unit additionally allows entry of different durations for the respective activation phases.

4. An apparatus as claimed in claim 1 wherein said control unit additionally allows entry of respectively different time intervals between successive activation phases.

5. An apparatus as claimed in claim 1 wherein said control unit, upon entry of said selectable value for said operating parameter, determines whether said selectable value is a permissible value for said operating parameter within said at least one of said activation phases, and said control unit, if said selectable value for said operating parameter is an impermissible value in said at least one of said activation phases, inhibiting said enabling arrangement.

6. An apparatus as claimed in claim 5 wherein said display identifies any of said activation phases containing an impermissible value of said operating parameter.

7. An apparatus as claimed in claim 5 wherein said control unit has a model of said apparatus stored therein, and wherein said control unit enters said selected value for said operating parameter into said model to determine whether said selected value is permissible in said at least one of said activation phases for current values of said time intervals and current values for said durations.

8. An apparatus as claimed in claim 7 wherein said control unit, if said selected value is impermissible, determines a permissible value for said operating parameter coming closest to said selectable value, using said model, and wherein said control unit causes said permissible value to be shown on said display within said at least one activation phase.

9. An apparatus as claimed in claim 8 wherein said control unit determines said permissible value with a simulation calculation.

10. An apparatus as claimed in claim 1 wherein said control unit allows entry of a selectable time duration for at least one of said activation phases and wherein said control unit determines whether said selectable value for said time duration is permissible, given a current value for said operating parameter and a current value for said time intervals, and wherein said control unit inhibits said enabling arrangement if said selectable value for said time duration is impermissible.

11. An apparatus as claimed in claim 10 wherein said display identifies any of said activation phases having an impermissible value for said time duration.

12. An apparatus as claimed in claim 10 wherein said control unit has a model of said apparatus stored therein and wherein said control unit determines whether said selectable value for said time duration is permissible dependent on said model, given said current value for said operating parameter and for said time intervals.

13. An apparatus as claimed in claim 12 wherein said control unit, if said value for said time duration is impermissible, determines a permissible value for said time duration coming closest to said selectable value for said time duration dependent on said model, and wherein said display displays said permissible value of said time duration coming closest to said selectable value.

14. An apparatus as claimed in claim 13 wherein said control unit determines said permissible value for said time duration coming closest to said selectable value for said time duration by a simulation calculation.

15. An apparatus as claimed in claim 1 wherein said control unit allows entry of a selectable value for at least one of said time intervals, and wherein said control unit determines whether said selectable value for at least one of said time intervals is permissible, given a current value of said operating parameter and said time duration of said activation phases, and wherein said control unit inhibits said enabling arrangement if said selectable value for said at least one time interval is impermissible.

16. An apparatus as claimed in claim 15 wherein said display identifies any time interval having an impermissible value.

17. An apparatus as claimed in claim 15 wherein said control unit has a model of said apparatus stored therein, and wherein said control unit determines whether said selectable value for said at least one of said time intervals is permissible dependent on said model.

18. An apparatus as claimed in claim 17 wherein, if said selectable value for said at least one of said time intervals is impermissible, said control unit determines a permissible value for said at least one of said intervals coming closest to said selectable value, and wherein said display shows said permissible value for said at least one of said time intervals.

19. An apparatus as claimed in claim 18 wherein said control unit determines said permissible value for said at least one of said time intervals with a simulation calculation.

20. An apparatus as claimed in claim 1 wherein said control unit allows entry of a selectable value for a further operating parameter which will be effective in at least one of said activation phases, and wherein said display shows said value for said further operating parameter within the rectangle representing the activation phase in which said further operating parameter will be effective, and wherein said display shows said further operating parameter as a stripe having a width along said time axis corresponding to said selected value of said further operating parameter.

21. An apparatus as claimed in claim 1 comprising components for conducting a medical examination, with at least one of said components having said operating parameter associated therewith.

22. An apparatus as claimed in claim 21 wherein said at least one of said components is an x-ray tube having a tube current and a mAs product associated therewith, at least one of said tube current and said mAs product forming said operating parameter, and wherein said activation phase comprises a duration of x-ray emission from said x-ray tube and wherein said time interval comprises a waiting time between successive exposures using said radiation.

23. An apparatus as claimed in claim 1 further comprising a detector for x-rays from said x-ray tube, said detector producing detector output signals, and a computer for producing a computed tomography image from said detector output signals.

24. An apparatus as claimed in claim 23 wherein said control unit allows entry of a selectable value for a further operating parameter, said further operating parameter comprising a slice thickness of an examination subject.

25. An apparatus as claimed in claim 22 further comprising components for conducting an angiography examination using said x-ray tube.

26. An apparatus as claimed in claim 1 wherein said actuatable enabling arrangement is a manually actuatable enabling arrangement.

* * * * *